(12) United States Patent
Dyott et al.

(10) Patent No.: US 7,120,323 B2
(45) Date of Patent: Oct. 10, 2006

(54) REDUCTION OF LINEAR BIREFRINGENCE IN CIRCULAR-CORED SINGLE-MODE FIBER

(75) Inventors: Richard Dyott, Oak Lawn, IL (US); Sid Bennett, Chicago, IL (US)

(73) Assignee: KVH Industries, Inc., Middletown, RI (US)

( * ) Notice: Subject to any disclaimer, the term of this patent is extended or adjusted under 35 U.S.C. 154(b) by 260 days.

(21) Appl. No.: 09/921,166

(22) Filed: Aug. 2, 2001

(65) Prior Publication Data

US 2002/0031292 A1    Mar. 14, 2002

Related U.S. Application Data

(60) Provisional application No. 60/222,389, filed on Aug. 2, 2000.

(51) Int. Cl.
*G02B 6/00* (2006.01)

(52) U.S. Cl. .......................................... 385/11; 385/121
(58) Field of Classification Search ................ 385/11, 385/12, 121, 123, 124, 125, 126, 127, 128
See application file for complete search history.

(56) References Cited

U.S. PATENT DOCUMENTS

| | | | |
|---|---|---|---|
| 4,571,650 A | 2/1986 | Ojima et al. |
| 4,603,931 A | 8/1986 | Ruffman |
| 4,615,582 A | 10/1986 | Lefevre et al. |
| 4,630,229 A | 12/1986 | D'Hondt |
| 4,630,890 A | 12/1986 | Ashkin et al. |
| 4,637,722 A | 1/1987 | Kim |
| 4,668,264 A | 5/1987 | Dyott |
| 4,669,814 A | 6/1987 | Dyott |
| 4,697,876 A | 10/1987 | Dyott |
| 4,712,866 A | 12/1987 | Dyott |
| 4,733,938 A | 3/1988 | Lefevre et al. |
| 4,740,085 A | 4/1988 | Lim |
| 4,755,021 A | 7/1988 | Dyott |
| 4,756,589 A | 7/1988 | Bricheno et al. |
| 4,765,739 A | 8/1988 | Koizumi et al. |
| 4,776,700 A | 10/1988 | Frigo |
| 4,796,993 A | 1/1989 | Sonobe et al. |
| 4,798,438 A * | 1/1989 | Moore et al. ................. 385/43 |
| 4,815,817 A | 3/1989 | Levinson |
| 4,842,409 A | 6/1989 | Arditty et al. |
| 4,848,910 A | 7/1989 | Dupraz |
| 4,883,358 A | 11/1989 | Okada |

(Continued)

FOREIGN PATENT DOCUMENTS

DE    33 05 104 A1    8/1984

(Continued)

OTHER PUBLICATIONS

Blake et al., "In-Line Interferometer Current Sensor," IEEE Transactions, 11(1):116-121 (1996).

(Continued)

*Primary Examiner*—Thanh-Tam Le
(74) *Attorney, Agent, or Firm*—Foley Hoag

(57) ABSTRACT

A method is described for reducing the effect of linear birefringence in an optical fiber, in particular a circular-cored single-mode fiber. The invention may also be directed to an optical fiber having a reduced linear birefringence. A length of the optical fiber may be subdivided into a plurality of sections and a twist having a predetermined sense of rotation and a twist angle may be introduced between the sections. Fibers of this type may find applications, for example, in fiber-optic current and magnetic field sensors.

11 Claims, 1 Drawing Sheet

U.S. PATENT DOCUMENTS

| | | | |
|---|---|---|---|
| 4,887,900 A | | 12/1989 | Hall |
| 4,926,040 A | * | 5/1990 | Turpin et al. ............... 250/225 |
| 4,943,132 A | | 7/1990 | Huang |
| 5,033,854 A | | 7/1991 | Matthews et al. |
| 5,048,908 A | * | 9/1991 | Blonder et al. ............... 385/39 |
| 5,048,962 A | | 9/1991 | Kurokawa et al. |
| 5,074,665 A | | 12/1991 | Huang et al. |
| 5,080,489 A | | 1/1992 | Nishikawa et al. |
| 5,106,193 A | | 4/1992 | Fesler et al. |
| 5,133,600 A | | 7/1992 | Schröder |
| 5,135,555 A | | 8/1992 | Coyle, Jr. et al. |
| 5,289,257 A | | 2/1994 | Kurokawa et al. |
| 5,289,258 A | | 2/1994 | Szafraniec et al. |
| 5,298,047 A | | 3/1994 | Hart, Jr. et al. ............... 65/432 |
| 5,331,404 A | | 7/1994 | Moeller et al. |
| 5,351,123 A | | 9/1994 | Spahlinger |
| 5,359,413 A | | 10/1994 | Chang et al. |
| 5,365,338 A | | 11/1994 | Bramson |
| 5,412,471 A | | 5/1995 | Tada et al. |
| 5,418,881 A | * | 5/1995 | Hart et al. ................. 385/123 |
| 5,459,575 A | | 10/1995 | Malvern |
| 5,469,257 A | | 11/1995 | Blake et al. |
| 5,469,267 A | | 11/1995 | Wang |
| 5,471,301 A | | 11/1995 | Kumagai et al. |
| 5,493,396 A | | 2/1996 | Sewell |
| 5,500,909 A | | 3/1996 | Meier |
| 5,504,684 A | | 4/1996 | Lau et al. |
| 5,552,887 A | | 9/1996 | Dyott |
| 5,559,908 A | | 9/1996 | August et al. |
| 5,654,906 A | | 8/1997 | Youngquist |
| 5,655,035 A | | 8/1997 | Burmenko |
| 5,664,037 A | * | 9/1997 | Weidman .................... 385/46 |
| 5,682,241 A | | 10/1997 | Mark et al. |
| 5,694,512 A | * | 12/1997 | Gonthier et al. ............ 385/140 |
| 5,701,177 A | | 12/1997 | Kumagai et al. |
| 5,701,376 A | | 12/1997 | Shirasaki ................... 385/123 |
| 5,767,509 A | | 6/1998 | Cardova et al. |
| 5,781,675 A | | 7/1998 | Tseng et al. |
| 5,822,487 A | * | 10/1998 | Evans et al. ................ 385/123 |
| 5,854,864 A | | 12/1998 | Knoesen et al. |
| 5,898,496 A | | 4/1999 | Huang et al. |
| 5,943,466 A | | 8/1999 | Henderson et al. ......... 385/123 |
| 5,946,097 A | | 8/1999 | Sanders et al. |
| 5,987,195 A | | 11/1999 | Blake |
| 6,023,331 A | | 2/2000 | Blake et al. ................ 356/345 |
| 6,025,915 A | | 2/2000 | Michal et al. |
| 6,047,095 A | | 4/2000 | Knoesen et al. |
| 6,075,915 A | | 6/2000 | Koops et al. |
| 6,148,131 A | | 11/2000 | Geertman |
| 6,163,632 A | | 12/2000 | Rickman et al. |
| 6,185,033 B1 | | 2/2001 | Bosc et al. |
| 6,233,371 B1 | * | 5/2001 | Kim et al. .................... 385/11 |
| 6,301,400 B1 | | 10/2001 | Sanders |
| 6,341,503 B1 | * | 1/2002 | Miller et al. ................. 65/387 |
| 6,351,310 B1 | | 2/2002 | Emge et al. |
| 6,370,289 B1 | | 4/2002 | Bennett |
| 6,389,185 B1 | * | 5/2002 | Meise et al. .................. 385/11 |
| 6,396,965 B1 | | 5/2002 | Anderson |
| 6,429,939 B1 | | 8/2002 | Bennett et al. |
| 6,519,404 B1 | * | 2/2003 | Yoshida et al. ............. 385/128 |
| 6,535,657 B1 | | 3/2003 | Dyott |
| 6,539,134 B1 | * | 3/2003 | Dyott ........................... 385/11 |
| 6,542,651 B1 | | 4/2003 | Bennett |
| 6,563,589 B1 | | 5/2003 | Bennett et al. |
| 6,594,020 B1 | | 7/2003 | Dyott |
| 6,703,821 B1 | | 3/2004 | Dyott |
| 6,707,558 B1 | | 3/2004 | Bennett |
| 2002/0018212 A1 | | 2/2002 | Bennett et al. |
| 2002/0025098 A1 | | 2/2002 | Dyott |
| 2002/0027659 A1 | | 3/2002 | Dyott |
| 2002/0180416 A1 | | 12/2002 | Dyott |

FOREIGN PATENT DOCUMENTS

| | | |
|---|---|---|
| DE | 36 15 305 A1 | 11/1987 |
| DE | 36 15305 A1 | 11/1987 |
| DE | 37 42 201 A1 | 6/1989 |
| DE | 37 42202 A1 | 6/1989 |
| EP | 0 551 874 A2 | 7/1993 |
| EP | 0 586 242 A1 | 3/1994 |
| EP | 0 686 867 A1 | 12/1995 |
| EP | 0 722 081 A2 | 7/1996 |
| EP | 856 737 A1 | 8/1998 |
| EP | 0 871 009 A1 | 10/1998 |
| EP | 0 872 756 A1 | 10/1998 |
| EP | 10300797 | 11/1998 |
| FR | 2 535 463 | 5/1984 |
| FR | 2 535 463 A | 5/1984 |
| JP | 07209398 | 8/1995 |
| WO | WO 83/00232 | 1/1983 |
| WO | WO 98/53352 * | 11/1998 |
| WO | WO98/58268 A | 12/1998 |
| WO | WO00/36425 | 6/2000 |

OTHER PUBLICATIONS

Bohnert et al., "Field Test of Interferometric Optical Fiber High-Voltage and Current Sensors," Tenth International Conference on Optical Fibre Sensors, Oct. 1994.

Gronau et al., "Digital signal processing for an open-loop fiber-optive gyroscope," Applied Optics, Sep. 1, 1995.

Alekseev et al; Fiber Optic Gyroscope With Suppression of Excess Noise From the Radiation Source, Technical Physical Letters, 24(9): 719-721, (Sep. 1998).

Blake et al., "In-Line Sagnac Interferometer Current Sensor," IEEE, pp. 116-121 (1995).

Blake and Szafraniec, "Random Noise in PM and Depolarized Fiber Gyros", OSA Symposium Proceedings, 1997, OWB2, pp. 122-125.

Bohnert. et al., "Field Test of Interferometric Optical Fiber High-Voltage and Current Sensors" SPIE, vol. 2360 pp. 16-19 (Feb. 1994).

Bohnert. et al., "Temperature and Vibration Insensitive Fiber-Optic Current Sensor" ABB, vol. 2360, pp. 336-339 (Feb. 1994).

Burns, et al., "Excess Noise in Fiber Gyroscope Sources", IEEE Photonics Technology Letter, vol. 2, No. 8, Aug. 1990, pp. 606-608.

Clark et al., "Application of a PLL and ALL Noise Reduction Process in Optical Sensing System," IEEE Translations on Industrial Electronics, vol. 44, No. 1, Feb. 1997, pp. 136-138.

Dagenais et al., "Low-Frequency Intensity Noise Reduction for Fiber-Optic Sensor Applications," Optical Fiber Sensors Conference, Jan. 29-31, 1992, pp. 177-180.

Dupraz, J.P., "Fiber-Optic Interferometers for Current Measurement: Principles and Technology", Alsthom Review No. 9: 29-44 (Dec. 1987).

Frosio, G. and Dändliker, "Reciprocal Reflection Interferometer for a Fiber-Optic Faraday Current Sensor", Applied Optics 33 (25): 6111-6122 (Sep. 1, 1994).

Gronau Yuval et al.; "Digital Signal Processing For An Open-Loop Fiber-Optic Gyroscope", Applied Optics, Optical Society of America, Washington, U.S., vol. 34, No. 25, Sep. 1, 1995, pp. 5849-5853.

Killian M. Kevin; "Pointing Grade Fiber Optic Gyroscope", IEEE AES Systems Magazine, pp. 6-10 (Jul. 1994).

LaViolette and Bossler: "Phase Modulation Control for An Interferometric Fiber Optic Gyroscope", IEEE Plan 90, Position Location and Navigation Symposium, Las Vegas, (Mar. 20-23, 1990).

Lefevre, "The Fiber-Optic Gyroscope", Artech House, Boston, pp. 29-30 (1993).

McCallion and Shimazu; "Side-Polished Fiber Provides Functionality and Transparency", Laser Focus World, 34 (9): S19-S24, (Sep. 1, 1998).

Moeller and Burns, "1.06 μm All-fiber Gyroscope with Noise Subtraction, Proceedings of the Conference on Optical Fiber Sensors", IEEE-OSA, Monterey, CA, 1992, pp. 82-85.

Moeller and Burns, "Observation of Thermal Noise in a Dynamically Biased Fiber-Optic Gyro", Optical Letters, 1996, vol. 21, pp. 171-173.

Nikros Drakos, "Circular Polarization States for Light, and Quarter-Wave Plates," *Computer Based Learning Unit, University of Leeds* (Mar. 2, 1998).

Ono et al.; "A Small -Sized, Compact, Open-loop Fibre-Optic Gyroscope with Stabilized Scale Factor", Meas. Sci. Technol. 1: 1078-1083, (1990.

Polynkin et al.; "All-Optical Noise-Subtraction Scheme for a Fiber-Optic Gyroscope", Optics Letters, 25(3): 147-149, (Feb. 1, 2000).

Rabelo et al.; "SNR Enhancement of Intensity Noise-Limited FOGs", Journal of Lightwave Technology 18(12):2146-2150 (Dec. 2000).

Short, S. et al., "Elimination of Birefringence Induced Scale Factor Errors in the In-Line Sagnac Interferometer Current Sensor", Journal of Lightwave Technology 16 (10): 1844-1850 (Oct. 1998).

US 6,208,775, 03/2001, Dyott (withdrawn)

* cited by examiner

REDUCTION OF LINEAR BIREFRINGENCE IN CIRCULAR-CORED SINGLE-MODE FIBER

RELATED APPLICATIONS

This application claims priority to, and incorporates by reference, the entire disclosure of U.S. Provisional Patent Application No. 60/222,389, filed on Aug. 2, 2000.

FIELD OF THE INVENTION

The invention relates to the field of fiber optics, and more particularly to birefringence in single-mode fibers.

BACKGROUND OF THE INVENTION

Linear birefringence in a single-mode fiber optic sensing coil employing the Faraday effect has the effect of reducing the sensitivity of the coil to magnetic fields. The sensitivity decreases with increasing length and birefringence of the coil. Birefringence occurs even if the sensing fiber is straight, due to the presence of residual linear birefringence resulting from core ellipticity. Even nominally circular core single mode fibers possess some core ellipticity due to imperfections in the production process. Additionally, bending or other anisotropic stresses on the core contribute to birefringence, such as when the fiber is formed into a coil.

Linear birefringence tends to suppress the response of the fiber to magnetic fields. As this effect is temperature dependent, and each fiber has different characteristics, it is difficult to produce a sensing coil whose characteristics are known over the operating temperature range. Moreover, measuring the coil temperature may be impracticable and expensive.

In the short section of fiber that is used for a sensing coil (a few meters to 50 meters), the ellipticity is relatively constant. This arises from the method of manufacture of optical fiber, where the fiber is drawn down from a preform. A preform is a version of the fiber that has a larger diameter than the fiber, but is shorter in length. Exemplary length ratios (fiber/preform, for fibers manufactured by KVH Industries) are approximately 4000:1. In other words, 0.25 mm of preform length yield approximately 1 meter of fiber. Over this short preform length the ellipticity will not change significantly, so that the ellipticity can be considered as being constant in that section of fiber.

Several approaches have been proposed to overcome the deleterious effects caused by linear birefringence when the fiber is used for current sensing. For example, circular birefringence can be introduced by torsion-type twists to "swamp" the linear birefringence and achieve coupling of the linear modes. Alternatively or in addition, the preform or the fiber can be spun or rotated in an oscillating manner during drawing to reduce polarization mode dispersion (PMD). These remedies tend to complicate the fiber or coil fabrication process, may require annealing, and are expensive.

It would therefore be desirable to provide an optical fiber for magnetic field and current sensing applications and a method of producing such an optical fiber that has increased sensitivity to a magnetic field and reduced temperature dependence by reducing the deleterious effects caused by linear birefringence and that can be produced at less cost.

SUMMARY OF THE INVENTION

The invention relates to reducing the effect of linear birefringence in an optical fiber, in particular a circular-cored single-mode fiber. According to one aspect of the invention, a method is disclosed of reducing linear birefringence in an optical fiber, which may include subdividing a length of the optical fiber into a plurality of sections, and introducing between the sections a twist having a predetermined sense of rotation and a twist angle. Twist, as used herein, may be a permanent rotational displacement of the fiber from its initial position over a distance which is a small fraction of a beat length. In one method, the twist occurs over a length of less than 1 mm. According to another aspect of the invention, an optical fiber with reduced linear birefringence may include a plurality of fiber sections, and a twist located between adjacent sections. The sense of rotation of the twist between sections along the optical fiber may be reversed after an accumulated twist between previous fiber sections is substantially equal to or greater than 90°. The distance over which the accumulated angle is 90° may preferably be less than half of the beat length. As is known in the art, a beat length is the distance along the fiber required for two propagating waves having differing velocities to move out of and back into synchronization.

Embodiments of the invention may include one or more of the following features. The twist angle may be less than or equal to 90°, with the twists produced by heating the fiber to a softening point of the fiber material, without affecting the shape of the fiber core. (Twists greater than 90° may be used, although they offer no benefit over twists of less than 90°.) More particularly, the orientation of the fiber is substantially maintained between twists, i.e., the fiber sections themselves are not twisted. The twists may be produced either with a consistent sense of rotation of the twists along the fiber or by reversing the sense of rotation, as described above.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

By way of background information, consider a linearly polarized wave launched along one of the two residual birefringent axes of an optical fiber. It will have a different propagation velocity than a wave launched in the other orthogonal axis. Although this difference is typically not great, it is sufficient to adversely effect the Faraday effect sensitivity. The sensitivity, S, of a fiber optic coil to an electric current flowing through a wire enclosed by the coil can be shown to be:

$S = \rho \sin \delta / \delta,$ wherein

ρ=VNI:

V=Verdet Constant in rad/Amp

N=number of turns in the fiber coil

I=current in conductor enclosed by coil and;

δ=βNDπ:

β=linear birefringence in rad/m

D=diameter of the fiber coil in meters.

From this expression it may be seen that the sensitivity of the coil, all other things held constant, is a sin(x)/x function of the product of the linear birefringence and the length of the coil, multiplied by a factor that is proportional to both the current and the length of the coil. Birefringence itself causes the sensitivity of the coil to vary from the ideal by an unknown amount, and since the birefringence has a stress based component, it has an unknown temperature dependence.

Figure 1:
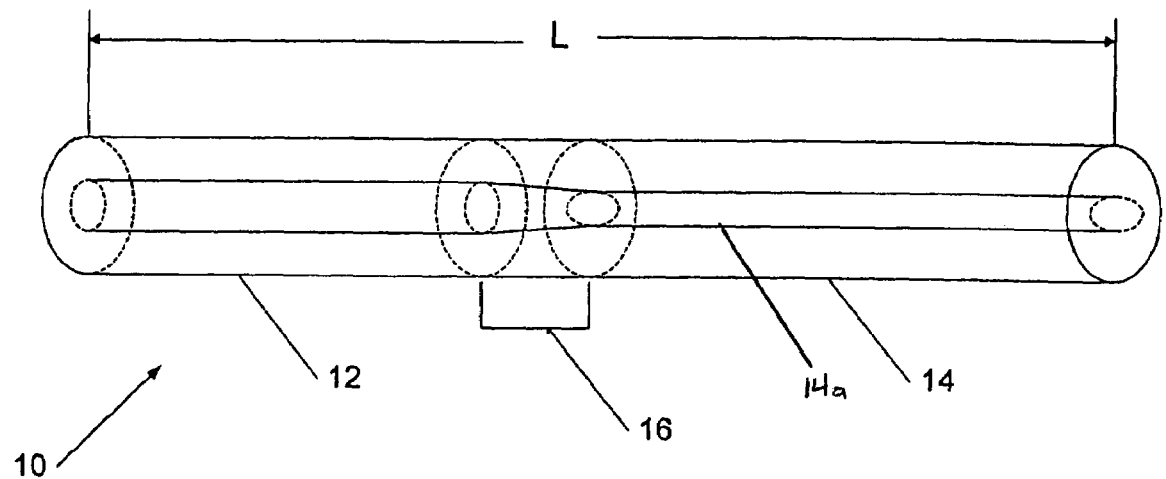
FIG. 1 an exemplary fiber having birefringence with a 90° twist section according to the invention.

Referring now to FIG. 1, in a first embodiment of the invention, a length L of an optical fiber 10 may be segmented into two sections 12 and 14, with an approximate 90° splice or twist 16 introduced between the sections 12 and 14. The individual sections 12, 14 may run straight and may not include twists. The light waves propagate in the fiber 10 across both sections 12 and 14 without changing their physical general orientation, but the axis x—x of the fiber ellipse 12a of fiber section 12 will rotate by approximately 90° at the splice 16 to axis x'—x' of fiber ellipse 14a of section 14. This may have the effect of interchanging the effects of the linear birefringence between the two orthogonal waves. By the time that the two waves introduced at one end of the fiber section 12 reach the far end of the second fiber section 14, the overall retardation may be the same for each mode for the case having even numbers of fiber sections, such as the two sections of FIG. 1. This may have the effect of eliminating ellipticity as a contribution to linear birefringence of the overall fiber length.

At first, the introduction of discrete rotations at the splice 16 may appear to be a piecewise approximation to the aforedescribed technique of spinning the fiber as it is drawn. However, with the technique of the present invention, any well-made single mode fiber may be utilized, since discrete rotations may be introduced by either an approximately 90° splice or a melted twist as described in the co-pending U.S. patent application Ser. No. 09/337,223 to Dyott, having a filing date of Jun. 22, 1999, which is incorporated herein by reference. Accordingly, the method of the invention may be considerably less costly than making special fiber. It is noted that optical fiber 10 may typically include a coating (not shown) which may be removed from fiber 10 in the area of splice 16, such that the twist can be made. Subsequently, the coating may need to be replaced. In the context of the present invention, the word "twist" refers to a rotation of the fiber in the longitudinal direction about its core by either a splice or a melted twist.

Successive twists generally of approximately 90° may continue in the same sense of rotation or reverse rotation, since the fiber generally has 180° rotational symmetry, so that an approximately 90° rotation has the same effect as an approximately −90° rotation. In other words, the fiber in this embodiment of the present invention may have two identifiable orthogonal axes of linear polarization arising out of the residual ovality of the core or residual stresses from the drawing process, and over the very short distance involved, these axes may not rotate with respect to the fiber itself. An approximately 90° twist is effective as it introduces the maximum angular change per twist.

Figure 2:
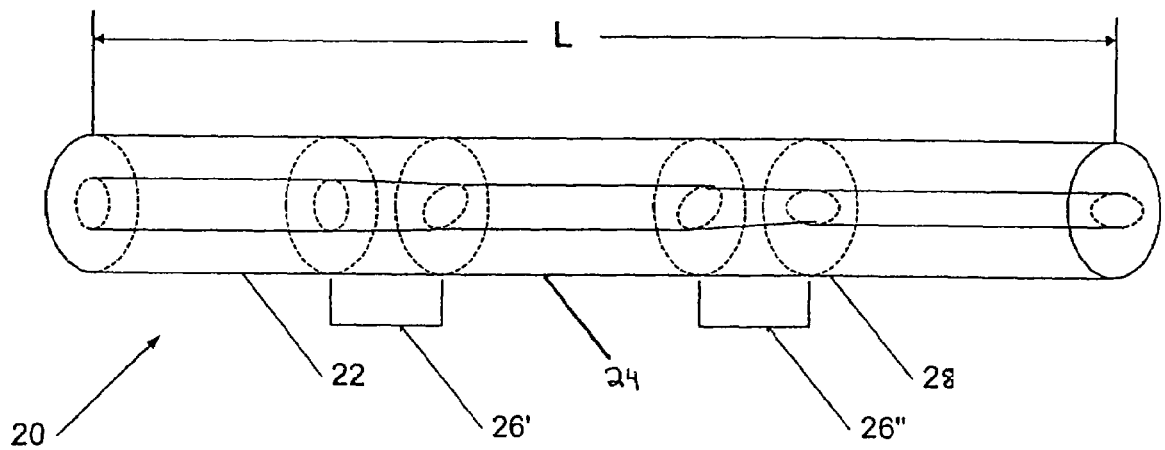
FIG. 2 an exemplary fiber having birefringence with two consecutive 45° twist sections according to the invention.

FIG. 2 depicts a second embodiment using a lesser angle, for example, 45°. In this embodiment, a length L of an optical fiber 20 may be segmented into several sections. The illustrated example depicts three sections 22, 24, and 28, with two 45° splices or twists 26', 26" introduced along the fiber length. Successive twists would preferably continue in the same sense of rotation, until the total accumulated twist angle is approximately 90°. Thereafter, the sense of rotation may be reversed. The individual light waves will continue to propagate in the fiber 20 across the three sections 22, 24 and 28 without changing their physical orientation, but the axis y-y of the fiber ellipse 22a of section 22 will rotate by approximately 90° after traversing both splices 26', 26" to axis y'—y' of the fiber ellipse 28a of section 28.

If this occurs often enough, it may minimize the effects of linear birefringence and may stabilize the fiber sensitivity to the Faraday effect. In the embodiments of the twist described here, it is clear that the relatively "abrupt" junction between the fiber sections results in interchange of energy between the modes. The junction may preferably be long enough so as not to cause reflection and scattering of the propagating light, but also preferably not be so long that it can be considered adiabatic and slowly rotates the plane of polarization.

It may not be sufficient to use only one twist at the center. This depends on the differential retardance (birefringence) between the modes. It is desirable to restrict the cumulative retardance along the fiber to a fraction of a beat length; that is, the cumulative retardance may preferably be less than 180° in any section of fiber length. The smaller the total retardance per fiber section, the better the expected performance may be. Fibers may have from about 10° to several thousand degrees of retardance per meter. More likely, however, retardance may be much less than 500°/m for typical modem single-mode communication fibers. By using three twists, i.e., by creating four sections, the cumulative retardance may be limited to that of one quarter of the length of the entire fiber. The number of twists per meter may likely depend on the characteristic properties of the fiber.

It has been found that, in using torsion-type twists, two approximately 360° turns for a fiber having a measured retardance of about 100°/m (considered a large value), may be sufficient to render the fiber insensitive to polarization effects. In stress torsion induced circular birefringence, the magnitude of the coupling effect depends on the relative values of the circular and linear birefringence. While the effect of the torsion-type twists and the twist method of the present invention may not be exactly equal, it is unlikely that the circular birefringence due to practical torsion twist rates will have an effect greater than the twist technique of the present invention. Using the twist technique of the present invention, the two whole (approximately 360°) turns could be accomplished with 8 twists, creating 9 fiber sections.

Modern communications fibers may have a typical beat length of 6 meters, implying a residual retardance of approximately 60°/m. As such, only about 4 sections may be needed. The sections need be only approximately the same length, and the twist angles only approximate to achieve the desired result.

To increase the effectiveness of the method even further, the twist technique may be combined with other techniques, such as annealing or a toroidal coil (U.S. Pat. No. 6,023,331 to Blake et al.) or a Berry's phase coil.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of reducing the effect of linear birefringence in an optical fiber, comprising:
   (a) heating a length of the optical fiber; and
   (b) introducing into the length of said fiber a twist having a predetermined sense of rotation and a twist angle, thereby creating a plurality of sections in said fiber; and
   (c) reversing the sense of rotation of the twist between sections after an accumulated twist for previously introduced twists between sections is substantially equal to 90°.

2. The method of claim 1, wherein the twist angle between respective ends of the adjacent sections is substantially 90°.

3. The method of claim 1, wherein the twist angle between respective ends of the adjacent sections is less than 90°.

4. The method of claim 1, wherein the twist angle between respective ends of the adjacent sections is greater than 90°.

5. A method of reducing the effect of linear birefringence in an optical fiber, comprising:
   (a) heating a length of the optical fiber; and
   (b) introducing into the length of said fiber a twist having a predetermined sense of rotation and a twist angle, thereby creating a plurality of sections in said fiber; wherein the twist angle between respective ends of the adjacent sections is substantially equal or less than 90°.

6. The method of claim 5, wherein a cumulative retardance along each of the sections is less than 180°.

7. An optical fiber with reduced effects of linear birefringence, comprising a length of optical fiber, wherein said fiber comprises a twist separating said fiber into a plurality of fiber sections, and wherein said twist is formed by heating said fiber and wherein a twist angle between respective ends of the adjacent sections is substantially equal to 90°.

8. The optical fiber of claim 7, wherein a sense of rotation of the twist between sections along the optical fiber is reversed after an accumulated twist for previously introduced twists between sections is substantially equal to 90°.

9. The optical fiber of claim 7, wherein the optical fiber is a circular-cored single-mode fiber.

10. The optical fiber of claim 7, wherein an orientation of the fiber is maintained along the plurality of sections separated by said twist.

11. The optical fiber of claim 10, wherein a sense of rotation of the twist between sections along the optical fiber is reversed after an accumulated twist for previously introduced twists between sections is substantially equal to 90°.

* * * * *